United States Patent
Kim et al.

(10) Patent No.: US 11,708,477 B2
(45) Date of Patent: Jul. 25, 2023

(54) PLASTICIZER COMPOSITION AND RESIN COMPOSITION COMPRISING THE SAME

(71) Applicant: LG CHEM, LTD., Seoul (KR)

(72) Inventors: Hyun Kyu Kim, Daejeon (KR); Joo Ho Kim, Daejeon (KR); Jeong Ju Moon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/056,405

(22) PCT Filed: Dec. 11, 2019

(86) PCT No.: PCT/KR2019/017480
§ 371 (c)(1),
(2) Date: Nov. 17, 2020

(87) PCT Pub. No.: WO2020/122591
PCT Pub. Date: Jun. 18, 2020

(65) Prior Publication Data
US 2021/0214524 A1    Jul. 15, 2021

(30) Foreign Application Priority Data
Dec. 14, 2018    (KR) .................... 10-2018-0162237

(51) Int. Cl.
C08K 5/12    (2006.01)
C08K 5/1515    (2006.01)
C08K 11/00    (2006.01)
C08L 27/06    (2006.01)

(52) U.S. Cl.
CPC .............. *C08K 5/12* (2013.01); *C08K 5/1515* (2013.01); *C08K 11/00* (2013.01); *C08L 27/06* (2013.01)

(58) Field of Classification Search
CPC ....... C08L 27/06; C08L 101/00; C08K 5/016; C08K 5/11; C08K 5/12; C08K 2201/014
See application file for complete search history.

(56) References Cited

U.S. PATENT DOCUMENTS

| | | | |
|---|---|---|---|
| 10,822,472 B2 | 11/2020 | Kim et al. | |
| 2005/0020718 A1 | 1/2005 | Gosse et al. | |
| 2007/0293646 A1 | 12/2007 | Gosse et al. | |
| 2008/0188601 A1 | 8/2008 | Grass et al. | |
| 2008/0274364 A1 | 11/2008 | Gosse et al. | |
| 2009/0291304 A1 | 11/2009 | Gosse et al. | |
| 2010/0305250 A1* | 12/2010 | Colle | C08K 5/0016 524/112 |
| 2011/0040001 A1* | 2/2011 | Gosse | C08K 5/0016 524/285 |
| 2012/0071598 A1 | 3/2012 | Gosse et al. | |
| 2013/0317152 A1* | 11/2013 | Becker | D06N 3/06 524/296 |
| 2013/0317153 A1 | 11/2013 | Grass et al. | |
| 2015/0210827 A1 | 7/2015 | Yontz et al. | |
| 2016/0326347 A1 | 11/2016 | Wagner et al. | |
| 2017/0101520 A1 | 4/2017 | Yontz et al. | |
| 2017/0313850 A1 | 11/2017 | Pfeiffer et al. | |
| 2018/0163018 A1 | 6/2018 | Kim et al. | |
| 2018/0163019 A1 | 6/2018 | Kim et al. | |
| 2018/0171103 A1 | 6/2018 | Kim et al. | |
| 2018/0265672 A1 | 9/2018 | Kim et al. | |
| 2018/0291178 A1 | 10/2018 | Kim et al. | |
| 2019/0047938 A1 | 2/2019 | Kim et al. | |
| 2019/0048167 A1 | 2/2019 | Kim et al. | |
| 2019/0352487 A1 | 11/2019 | Yontz et al. | |
| 2019/0359789 A1 | 11/2019 | Pfeiffer et al. | |

FOREIGN PATENT DOCUMENTS

| | | |
|---|---|---|
| CN | 103221467 A | 7/2013 |
| CN | 103772848 A | 5/2014 |
| CN | 107108958 A | 8/2017 |
| CN | 107207865 A | 9/2017 |
| CN | 107709429 A | 2/2018 |
| CN | 107849299 A | 3/2018 |
| CN | 108699286 A | 10/2018 |
| CN | 108699287 A | 10/2018 |
| DE | 102010061868 A1 | 5/2012 |
| EP | 3395873 A1 | 10/2018 |
| KR | 10-0957134 B1 | 5/2010 |
| KR | 10-1010065 B1 | 1/2011 |
| KR | 10-20130119947 A | 11/2013 |
| KR | 10-20140005908 A | 1/2014 |
| KR | 10-20160106657 A | 9/2016 |
| KR | 10-20170066547 A | 6/2017 |
| KR | 10-20170121058 A | 11/2017 |
| KR | 10-20180005606 A | 1/2018 |
| KR | 10-20180028034 A | 3/2018 |
| WO | 2015112285 A1 | 7/2015 |
| WO | 2017125458 A1 | 7/2017 |
| WO | 2021054695 A1 | 3/2021 |

OTHER PUBLICATIONS

Yu'ai Huang and Shangjian Du, Fine Chemicals Formula Research and Product Formulation Technology (First Volume), Guangdong Science and Technology Press, Jun. 30, 2003, pp. 516-520 (7 Pages).

* cited by examiner

*Primary Examiner* — Jane L Stanley
(74) *Attorney, Agent, or Firm* — Dentons US LLP

(57) ABSTRACT

A plasticizer composition including a cyclohexane-1,2-diester-based material and diisononyl terephthalate. The plasticizer composition is superior to existing phthalate-based plasticizer products in terms of plasticization efficiency, volatile loss, and heat aging elongation retention rate, and can replace phthalate-based plasticizer products.

6 Claims, No Drawings

PLASTICIZER COMPOSITION AND RESIN COMPOSITION COMPRISING THE SAME

CROSS-REFERENCE TO RELATED APPLICATIONS

This application is a U.S. national stage of international Application No. PCT/KR2019/017480, filed on Dec. 11, 2019, and claims priority to and the benefit of Korean Patent Application No. 10-2018-0162237, filed on Dec. 14, 2018, the disclosures of which are incorporated herein by reference in their entirety.

TECHNICAL FIELD

The present invention relates to a plasticizer composition and a resin composition including the same, and more particularly, to a plasticizer composition that is environmentally friendly and has excellent safety and basic properties, and a resin composition including the same.

BACKGROUND ART

In the polyvinyl chloride compounding industry where high heat resistance and low volatile loss are the main required properties, an appropriate plasticizer is used. For example, in the case of polyvinyl chloride compounding for wire and cable applications, depending on the tensile strength, elongation rate, plasticization efficiency, volatile loss, tensile retention rate, and elongation retention rate requirements, one or more selected from the group consisting of a plasticizer, a filler, a stabilizer, a lubricant, and a flame retardant may be blended into polyvinyl chloride as an additive.

Currently, diisodecyl phthalate, which is a plasticizer that is typically used in the cable compounding and automotive fabric industries, is an environmental hormone-like material under observation, and therefore, the use thereof is being regulated. Accordingly, there is a need for the development of an environmentally-friendly plasticizer capable of replacing diisodecyl phthalate.

However, the development of a plasticizer that has equivalent or superior properties to diisodecyl phthalate and is environmentally friendly at the same time is currently insufficient.

Reference Document: KR10-0957134B

SUMMARY

The present invention is directed to providing a plasticizer composition that is environmentally friendly and has excellent safety, and more particularly, a plasticizer composition which has improved properties in terms of plasticization efficiency, volatile loss, a heat aging elongation retention rate, and the like, and in which properties such as tensile strength, elongation rate, and migration properties are maintained at an equivalent or higher level compared to those of existing products, and which has improved oil resistance.

Technical Solution

One aspect of the present invention provides a plasticizer composition that includes: a cyclohexane-1,2-diester-based material represented by Chemical Formula 1; and diisononyl terephthalate, wherein the cyclohexane-1,2-diester-based material and the diisononyl terephthalate are in a weight ratio of 95:5 to 5:95:

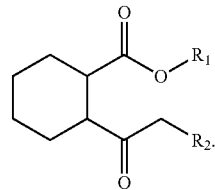

[Chemical Formula 1]

In Chemical Formula 1, $R_1$ and $R_2$ are each independently a C9 or C10 alkyl group.

Another aspect of the present invention provides a resin composition that includes a resin in an amount of 100 parts by weight and the above-described plasticizer composition in an amount of 5 to 150 parts by weight.

Since the plasticizer composition of the present invention is environmentally friendly and has excellent safety and basic properties, when included in a resin composition, the plasticizer composition of the present invention can allow properties such as tensile strength, elongation rate, and migration properties to be maintained at an equivalent or higher level compared to those of existing phthalate-based products and also significantly improves plasticization efficiency, volatile loss, heat aging elongation retention rate, and oil resistance.

DETAILED DESCRIPTION

Hereinafter, the present invention will be described in more detail to facilitate understanding of the present invention.

As used herein, the term "composition" encompasses not only a mixture of materials making up the relevant composition but also reaction products and decomposition products formed from the materials of the relevant composition.

As used herein, the prefix "iso-" is used to generically represent alkyl groups having a methyl group or ethyl group attached as a branched chain to the main chain thereof, and, unless otherwise specified, the prefix "iso-" may be used herein to generically represent alkyl groups having a methyl group or ethyl group attached as a branched chain to the main chain thereof, including those having a methyl group or ethyl group attached to a terminus.

As used herein, the term "isononyl group" may refer to an alkyl group that has a total of nine carbon atoms since one or more among one or two methyl groups, one ethyl group and one propyl group are substituted in the main chain thereof, forming a branch, and may be a term used to collectively refer to, for example, a 2-methyloctyl group, a 3-methyloctyl group, a 4-methyloctyl group, a 5-methyloctyl group, a 6-methyloctyl group, a 3-ethylheptyl group, a 2-ethylheptyl group, a 2,5-dimethylheptyl group, a 2,3-dimethylheptyl group, a 4,5-dimethylheptyl group, a 3-ethyl-4-methylhexyl group, a 2-ethyl-4-methylhexyl group, a 2-propylhexyl group, and the like. Commercially used isononanols (CAS Nos. 68526-84-1 and 27458-94-2) may refer to compositions of isomers having a degree of branching of 1.2 to 1.9, and some of these commercial alcohols may also include an n-nonyl group.

As used herein, the term "straight vinyl chloride polymer" may refer to a type of vinyl chloride polymer that has been polymerized through suspension polymerization, bulk polymerization, or the like, and may refer to a polymer which has the form of porous particles of several tens to hundreds of micrometers in size and in which a large number of pores are distributed and which has no cohesiveness and exhibits excellent flowability.

As used herein, the term "paste vinyl chloride polymer" may refer to a type of vinyl chloride polymer that has been polymerized through microsuspension polymerization, micro-seeded polymerization, emulsion polymerization, or the like, and may refer to a polymer which has the form of fine, dense, and pore-free particles of several tens to several thousands of nanometers in size and which has cohesiveness and exhibits poor flowability.

The terms "comprising," "including," "containing," "having," and derivatives thereof are not intended to exclude the presence of any additional components, steps, or procedures, whether they are specifically disclosed or not. To avoid any uncertainty, all compositions claimed through the use of the terms "comprising," "including," "containing," and "having," whether polymers or otherwise, may include any additional additives, adjuvants, or compounds unless otherwise stated. In contrast, the term "consisting essentially of" excludes any other component, step, or procedure from the scope of any subsequent description, and excludes those that are not essential to operability. The terms "consisting of" excludes any element, step, or procedure that is not specifically described or listed.

In the present specification, the amount of components in a composition are analyzed by carrying out gas chromatography using a gas chromatography instrument manufactured by Agilent Technologies Inc. (Agilent 7890 GC; column: HP-5, carrier gas: helium (flow rate: 2.4 mL/min, detector: F.I.D, injection volume: 1 µL, initial value: 70° C./4.2 min, end value: 280° C./7.8 min, programmed rate: 15° C./min).

In the present specification, "hardness" refers to Shore hardness (Shore "A" and/or Shore "D") as measured at 25° C. in accordance with ASTM D2240. The hardness is measured for 10 seconds using a 3T test specimen, and may be an index for evaluating plasticization efficiency where smaller hardness values indicate better plasticization efficiency.

In the present specification, "tensile strength" is measured in accordance with ASTM D638 by pulling a 1T test specimen at a cross head speed of 200 mm/min using a universal testing machine (UTM) (4466 manufactured by Instron) and determining a time point at which the test specimen is broken. The tensile strength is calculated by the following Equation 1:

Tensile strength (kgf/cm²)=Load (kgf)/Thickness (cm)×Width (cm). [Equation 1]

In the present specification, "elongation rate" is measured in accordance with ASTM D638 by pulling a 1T test specimen at a cross head speed of 200 mm/min using the UTM and determining a time point at which the test specimen is broken. The elongation rate is calculated by the following Equation 2:

Elongation rate (%)=Length after elongation/Initial length×100. [Equation 2]

In the present specification, "migration loss" is measured in accordance with KSM-3156 as follows. A test specimen having a thickness of 2 mm or more is prepared, plates are attached to both sides of the test specimen, and a load of 1 kgf/cm² is applied thereto. Subsequently, the test specimen is maintained in a hot-air convection oven (80° C.) for 72 hours and then taken out of the oven and cooled at room temperature for 4 hours. After removing the plates attached to both sides of the test specimen, the weights of the test specimen before and after being maintained in the oven along with the plates are measured, and migration loss is calculated by the following Equation 3. Here, the material of the plates may vary, and is, for example, polystyrene (PS), acrylonitrile-butadiene-styrene (ABS), glass, a specimen itself (in the case of a specimen plate), or the like. The plate material used herein for measurement is PS.

Migration loss (%)={(Initial weight of test specimen at room temperature−Weight of test specimen after being maintained in oven)/Initial weight of test specimen at room temperature}×100. [Equation 3]

In the present specification, "volatile loss" is determined by processing a test specimen at 80° C. for 72 hours and then weighing the test specimen. The volatile loss is calculated from following Equation 4:

Volatile loss(wt %)={(Initial weight of test specimen−Weight of test specimen after being processed)/Initial weight of test specimen}×100. [Equation 4]

The details of the above-described various measurement conditions, such as temperature, rotation speed, time, and the like, may vary from case to case, and when there is a difference in details from those described above, clear descriptions of the measurement methods and conditions will be provided separately.

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

According to one exemplary embodiment of the present invention, the plasticizer composition includes a cyclohexane-1,2-diester-based material represented by Chemical Formula 1; and a diisononyl terephthalate-based material:

[Chemical Formula 1]

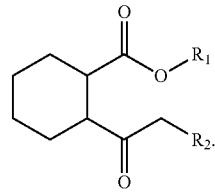

In Chemical Formula 1, $R_1$ and $R_2$ are each independently a C9 or C10 alkyl group.

In addition, according to one exemplary embodiment of the present invention, the plasticizer composition may further include an additional plasticizer, and the additional plasticizer may be an epoxidized oil or a trimellitate-based material, and at least one material selected from these materials may be applied as the additional plasticizer.

According to one exemplary embodiment of the present invention, the cyclohexane-1,2-diester-based material may be represented by Chemical Formula 1 and may impart environmental friendliness to the plasticizer composition by excluding phthalate components. In addition, the cyclohexane-1,2-diester-based material may further improve properties such as plasticization efficiency, elongation rate, and the like, of the plasticizer composition.

In this case, when the two ester groups are not attached to carbons 1 and 2 of the cyclohexane, migration properties upon compression and migration properties upon stress may be degraded.

In the cyclohexane-1,2-diester-based material, $R_1$ and $R_2$, which are the two alkyl groups attached to the two ester groups, are each independently a C9 or C10 alkyl group. When the $R_1$ and $R_2$ alkyl groups have less than 9 carbon atoms, volatile loss characteristics, migration loss characteristics, and mechanical properties such as tensile strength and the like may be degraded, and processability may be affected. On the other hand, when the $R_1$ and $R_2$ alkyl groups have more than 10 carbon atoms, processability and plasticization efficiency may be adversely affected. In order to obtain an optimized effect in this regard, it is preferable to select C9 or C10 alkyl groups.

For example, $R_1$ and $R_2$, which are the same or different from each other, each independently, may be one selected from the group consisting of an n-nonyl group, an isononyl group, a 2-propylheptyl group, an isodecyl group, and an n-decyl group, preferably one selected from the group consisting of an isononyl group, a 2-propylheptyl group, and an isodecyl group, and is preferably a branched alkyl group.

When the cyclohexane-1,2-diester-based material represented by Chemical Formula 1 is directly prepared, direct esterification or transesterification of cyclohexane 1,2-dicarboxylic acid or a derivative thereof with an alcohol may be carried out.

The derivative of cyclohexane 1,2-dicarboxylic acid may be one or more selected from the group consisting of anhydrides of cyclohexane-1,2-dicarboxylic acid and/or alkyl esters of cyclohexane 1,2-dicarboxylic acid. In this case, the alkyl ester may be a C1-C12 alkyl ester.

The alkyl groups of the finally prepared cyclohexane-1, 2-diester have 9 or 10 carbon atoms, and as the alkyl groups, the above-described alkyl groups are preferably applied. The alkyl groups may be derived from the alcohol used in the preparation of the cyclohexane-1,2-diester.

When the cyclohexane-1,2-diester-based material represented by Chemical Formula 1 is prepared by direct esterification, the alcohol may be used in an amount of 2 moles to 10 moles, 2 moles to 8 moles, 2 moles to 6 moles, or 2 moles to 5 moles, preferably 2 moles to 5 moles, relative to 1 mole of the cyclohexane 1,2-dicarboxylic acid or the derivative thereof.

The direct esterification may be carried out in the presence of a catalyst, and the catalyst may be one or more selected from the group consisting of an inorganic acid, an organic acid, and a Lewis acid, and is preferably one or more selected from the group consisting of an organic acid and a Lewis acid.

The inorganic acid may be one or more selected from the group consisting of sulfuric acid, hydrochloric acid, and phosphoric acid.

The organic acid may be one or more selected from the group consisting of p-toluenesulfonic acid, methanesulfonic acid, ethanesulfonic acid, propanesulfonic acid, butanesulfonic acid, and alkylsulfuric acid.

The Lewis acid may be one or more selected from the group consisting of an aluminum derivative (aluminum oxide or aluminum hydroxide), a tin derivative (C3-C12 fatty acid tin, tin oxide, or tin hydroxide), a titanium derivative (tetra C3-C8 alkyl titanate, titanium oxide, or titanium hydroxide), a lead derivative (lead oxide or lead hydroxide), and a zinc derivative (zinc oxide or zinc hydroxide).

When the catalyst is a homogeneous catalyst, the catalyst may be used in an amount of 0.01 to 5 parts by weight or 0.01 to 3 parts by weight, preferably 0.01 to 3 parts by weight, relative to 100 parts by weight of the sum of the cyclohexane 1,2-dicarboxylic acid or the derivative thereof and the alcohol.

When the catalyst is a heterogeneous catalyst, the catalyst may be used in an amount of 0.5 parts to 200 parts by weight or 0.5 parts to 100 parts by weight, preferably 0.5 parts to 200 parts by weight, relative to 100 parts by weight of the sum of the cyclohexane 1,2-dicarboxylic acid or the derivative thereof and the alcohol.

The direct esterification may be carried out at 100° C. to 280° C., 130° C. to 250° C., or 150° C. to 230° C., preferably 150° C. to 230° C.

The direct esterification may be carried out for 3 hours to 30 hours or 3 hours to 25 hours, preferably 3 hours to 25 hours.

Meanwhile, when the cyclohexane-1,2-diester-based material is prepared by transesterification, transesterification of the derivative of cyclohexane 1,2-dicarboxylic acid with an alcohol may be carried out.

The derivative of cyclohexane 1,2-dicarboxylic acid may be an alkyl ester of cyclohexane 1,2-dicarboxylic acid, and methyl ester of cyclohexane 1,2-dicarboxylic acid is preferably used to facilitate the separation of a reaction product.

The alcohol may be used in an amount of 2 moles to 10 moles, 2 moles to 8 moles, 2 moles to 6 moles, or 2 moles to 5 moles, preferably 2 moles to 5 moles, relative to 1 mole of the derivative of cyclohexane 1,2-dicarboxylic acid.

The transesterification may be carried out in the presence of a catalyst, and in such a case, the reaction time can be shortened.

The catalyst may be one or more selected from the group consisting of a Lewis acid and an alkali metal.

The Lewis acid has been described in the description of direct esterification, and may be one or more selected from the group consisting of an aluminum derivative (aluminum oxide or aluminum hydroxide), a tin derivative (C3-C12 fatty acid tin, tin oxide, or tin hydroxide), a titanium derivative (tetra C3-C8 alkyl titanate, titanium oxide, or titanium hydroxide), a lead derivative (lead oxide or lead hydroxide), and a zinc derivative (zinc oxide or zinc hydroxide).

In addition, the alkali metal may be one or more selected from the group consisting of sodium alkoxide, potassium alkoxide, sodium hydroxide, and potassium hydroxide, and one or a mixture of two or more of the metal catalysts may be used.

The catalyst may be used in an amount of 0.01 parts to 5 parts by weight or 0.01 parts to 3 parts by weight, preferably 0.01 parts to 3 parts by weight, relative to 100 parts by weight of the sum of the derivative of cyclohexane 1,2-dicarboxylic acid and the alcohol.

The transesterification may be carried out at 120° C. to 250° C., 135° C. to 230° C., or 140° C. to 220° C., preferably 140° C. to 220° C.

The transesterification may be carried out for 0.5 hour to 10 hours or 0.5 hour to 8 hours, preferably 0.5 hour to 8 hours.

In order to promote the discharge of water or of a lower alcohol such as methanol that is produced by the direct esterification or transesterification, one or more selected from the group consisting of benzene, toluene, xylene, and cyclohexane may be further added, and for the same purpose, commercially available nitrogen or the like in an entrained form may be used.

The cyclohexane-1,2-diester-based material represented by Chemical Formula 1 prepared by direct esterification or transesterification may be purified by carrying out separate post-treatment. The post-treatment may be one or more selected from the group consisting of deactivation (neutralization or base treatment) of the catalyst, washing, distillation (decompression or dehydration), and adsorption purification.

In addition, a preparation method which, unlike the above-described preparation methods, includes converting a dialkyl phthalate-based material into a cyclohexane-1,2-diester-based material by hydrogenating the dialkyl phthalate-based material in the presence of a metal catalyst may be used.

Hydrogenation is a reaction in which the aromaticity of the benzene ring of a phthalate is removed as hydrogen is added in the presence of a metal catalyst, and may be considered to be a kind of reduction reaction.

In the above-described hydrogenation, the phthalate-based material is reacted with hydrogen in the presence of the metal catalyst to synthesize a cyclohexane-1,2-diester-based material, and the reaction conditions thereof may be any conventional reaction conditions capable of hydrogenating only the benzene ring without affecting the carbonyl group substituted on the benzene.

The hydrogenation may be carried out using an additional organic solvent such as ethanol or the like, but the present invention is not limited thereto. As the metal catalyst, a Rh/C catalyst, a Pt catalyst, a Pd catalyst, and the like, which are generally used to hydrogenate a benzene ring may be used, but there is no limitation, and any metal catalyst capable of allowing the above-described hydrogenation may be used.

According to one exemplary embodiment of the present invention, the plasticizer composition includes diisononyl terephthalate along with the cyclohexane-1,2-diester-based material.

The above-described diisononyl terephthalate, which is an existing terephthalate-based plasticizer product that can replace diisononyl phthalate, has excellent mechanical properties such as tensile strength and elongation rate, but due to having very low plasticization efficiency and poor properties in terms of oil resistance, heat aging elongation retention rate, and tensile retention rate, is unsuitable for use as a substitute for diisononyl phthalate.

However, when the cyclohexane-1,2-diester-based material is used with diisononyl terephthalate as in the present invention, a synergistic effect is effected whereby the poor properties of diisononyl terephthalate are improved while the excellent properties of diisononyl terephthalate are maintained close to their original levels.

The upper limit of the weight ratio of the cyclohexane-1,2-diester-based material and the diisononyl terephthalate-based material may be 99:1, 95:5, 90:10, 85:15, 80:20, 75:25, 70:30, or 60:40, and the lower limit thereof may be 1:99, 5:95, 10:90, 15:85, 20:80, 25:75, 30:70, 40:60, or 50:50. Among these upper and lower limit ranges, the range of 95:5 to 5:95 or 90:10 to 10:90 is preferred, the range of 80:20 to 20:80 is more preferred, the range of 70:30 to 30:70 is even more preferred, and the range of 50:50 to 30:70 is still more preferred. In order to achieve the above-described synergistic effect, it is desirable to satisfy the above-described weight ratio range, and in this case, an improvement in volatile loss and oil resistance, a significant improvement of a heat aging elongation retention rate, and an improvement in mechanical properties such as tensile strength and an elongation rate can be achieved.

In particular, the plasticizer composition has excellent tensile strength, an excellent elongation rate, and excellent migration properties and thus can be applied to the calendering industry that manufactures sheets and the like, but may be more suitable for the compounding industry that manufactures wires and the like considering that the plasticizer composition allows properties such as elongation retention rate, tensile retention rate, and oil resistance to be significantly improved.

According to one exemplary embodiment of the present invention, the plasticizer composition may further include an additional plasticizer, and the additional plasticizer may be selected from among epoxidized oils and trimellitate-based materials. In the mixing of the cyclohexane-1,2-diester-based material and the diisononyl terephthalate, this additional plasticizer may complement migration properties and volatile loss characteristics, and may secure a stable improvement in tensile strength and elongation rate.

In regard to the weight ratio of the additional plasticizer relative to the sum of the weights of the cyclohexane-1,2-diester-based material and the diisononyl terephthalate, the upper limit of the ratio of the sum of the weights of the cyclohexane-1,2-diester-based material and the diisononyl terephthalate and the weight of the additional plasticizer may be 99:1, 95:5, 90:10, 85:15, 80:20, 75:25, 70:30, or 60:40, and the lower limit thereof may be 1:99, 5:95, 10:90, 15:85, 20:80, 25:75, 30:70, 40:60, or 50:50. Among these upper and lower limit ranges, the range of 90:10 to 10:90 or 90:10 to 30:70 is preferred, and the range of 80:20 to 50:50 is more preferred.

When the additional plasticizer satisfying the above-described ranges is further added, the quality of the plasticizer product can be further stabilized, and the mixing ratio of the cyclohexane-1,2-diester-based material and the diisononyl terephthalate can be applied with more flexibility.

According to one exemplary embodiment of the present invention, the epoxidized oil may allow thermal stability, volatile loss, oil resistance, and absorption rate of the plasticizer composition to be further improved. In addition, the epoxidized oil may allow the mechanical properties of the plasticizer composition such as tensile strength and elongation rate to be improved, and furthermore, with the addition thereof, improve heat resistance.

The epoxidized oil may be one or more selected from the group consisting of epoxidized soybean oil, epoxidized castor oil, epoxidized linseed oil, epoxidized palm oil, epoxidized stearate, epoxidized oleate, epoxidized tall oil, and epoxidized linoleate, preferably one or more selected from the group consisting of epoxidized soybean oil and epoxidized linseed oil.

The epoxidized oil may be prepared directly, or a commercially available product may be used.

The trimellitate-based material may impart environmental friendliness and excellent safety to the plasticizer composition. In addition, the properties of the plasticizer composition such as migration resistance, volatile loss, tensile retention rate, elongation retention rate, oil resistance, and the like can be further improved.

In particular, the trimellitate-based material may be selected from the group consisting of tri(2-ethylhexyl) trimellitate, triisononyl trimellitate, and tri(2-propylheptyl) trimellitate, and is preferably tri(2-ethylhexyl) trimellitate or triisononyl trimellitate.

When the above-described material is selected as the trimellitate-based material, it may contribute to the resulting plasticization efficiency, migration resistance, volatile loss, tensile retention rate, elongation retention rate, oil resistance, and the like to be at least equivalent to those of diisodecyl phthalate.

When the trimellitate-based material is directly prepared, direct esterification or transesterification of trimellitic acid or a derivative thereof with an alcohol may be carried out.

The derivative of trimellitic acid may be one or more selected from the group consisting of anhydrides of trimellitic acid and alkyl esters of trimellitic acid, and in this case, the alkyl ester may be a C1-C12 alkyl ester.

The alkyl groups of the finally prepared trimellitate may have 8 to 10 carbon atoms, preferably 8 to 9 carbon atoms.

When the trimellitate-based material represented by Chemical Formula 2 is prepared by direct esterification, the alcohol may be used in an amount of 3 moles to 15 moles, 3 moles to 12 moles, 3 moles to 10 moles, 3 moles to 8 moles, or 3 moles to 6 moles, preferably 3 moles to 6 moles, relative to 1 mole of the trimellitic acid or the derivative thereof.

Additional descriptions of the direct esterification are the same as descriptions provided in the preparation method of the cyclohexane-1,2-diester-based material.

Meanwhile, when the trimellitate-based material represented by Chemical Formula 2 is prepared by transesterification, transesterification of a derivative of trimellitic acid with an alcohol may be carried out. Here, the derivative of trimellitic acid may be an alkyl ester of trimellitic acid.

The alcohol may be used in an amount of 3 moles to 15 moles, 3 moles to 12 moles, or 3 moles to 10 moles, preferably 3 moles to 10 moles, relative to 1 mole of the derivative of trimellitic acid.

Additional descriptions of the transesterification are the same as descriptions provided in the preparation method of the cyclohexane-1,2-diester-based material.

The resin composition according to another aspect of the present invention includes a resin in an amount of 100 parts by weight and the above-described plasticizer composition in an amount of 5 parts to 150 parts by weight. The plasticizer composition may be included in an amount of 5 parts to 150 parts by weight, preferably 5 parts to 130 parts by weight, more preferably 10 parts to 120 parts by weight, relative to 100 parts by weight of the resin.

As the resin, resins known in the art may be used. For example, one or a mixture of two or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber, and a thermoplastic elastomer may be used, but the present invention is not limited thereto.

Generally, the resin composition in which the plasticizer composition is used may be formed into a resin product through melt processing or plastisol processing, and a resin for melt processing and a resin for plastisol processing may be prepared using different polymerization methods.

For example, a vinyl chloride polymer to be used in melt processing is prepared by suspension polymerization or the like and thus is used as a solid resin particle having a large particle diameter, and such a vinyl chloride polymer is referred to as a straight vinyl chloride polymer, and a vinyl chloride polymer to be used in plastisol processing is prepared by emulsion polymerization or the like and thus is used as a fine resin particle in a sol state, and such a vinyl chloride polymer is referred to as a paste vinyl chloride resin.

In the case of the straight vinyl chloride polymer, the plasticizer composition is preferably included in an amount ranging from 5 parts to 80 parts by weight relative to 100 parts by weight of the polymer, and in the case of the paste vinyl chloride polymer, the plasticizer composition is preferably included in an amount ranging from 40 parts to 120 parts by weight relative to 100 parts by weight of the polymer.

The resin composition may further include a filler. The filler may be used in an amount of 0 part to 300 parts by weight, preferably 50 parts to 200 parts by weight, more preferably 100 parts to 200 parts by weight, relative to 100 parts by weight of the resin.

The plasticizer composition according to one exemplary embodiment of the present invention may be used as a plasticizer in a resin product that is preferably applied to a straight vinyl chloride polymer and accordingly subjected to melt processing and processes such as calendering, extrusion, injection-molding, and the like, which will be described below.

As the filler, fillers known in the art may be used without particular limitation. For example, the filler may be one or a mixture of two or more selected from the group consisting of silica, magnesium carbonate, calcium carbonate, hard charcoal, talc, magnesium hydroxide, titanium dioxide, magnesium oxide, calcium hydroxide, aluminum hydroxide, aluminum silicate, magnesium silicate, and barium sulfate.

In addition, the resin composition may further include other additives such as a stabilizer and the like, as necessary. Each of the additives such as a stabilizer and the like may be included, for example, in an amount of 0 part to 20 parts by weight, preferably 1 part to 15 parts by weight, relative to 100 parts by weight of the resin.

As the stabilizer, for example, a calcium-zinc (Ca—Zn)-based stabilizer such as a complex stearate of calcium and zinc or the like may be used, but the present invention is not particularly limited thereto.

The resin composition may be applied to both melt processing and plastisol processing as described above, wherein the melt processing may be, for example, calendering, extrusion, or injection-molding, and the plastisol processing may be coating processing or the like.

The resin composition may be used for the production of electric wires, flooring materials, automotive interior materials, films, sheets, tubes, or the like.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

Preparation Example 1: Diisononyl cyclohexane-1,2-diester (1,2-DINCH)

After adding 462.5 g of cyclohexane-1,2-dicarboxylic anhydride, 1,296 g of isononanol, and 1.55 g of tetraisopropyl titanate as a catalyst to a 3 L four-neck reaction vessel equipped with a cooler, a condenser, a decanter, a reflux pump, a temperature controller, a stirrer, and the like, the temperature of the reaction vessel was set to 230° C., and direct esterification was carried out for about 6 hours while continuously introducing nitrogen gas. The reaction was terminated when the acid value reached 0.1.

After the reaction was completed, distillation extraction was carried out under reduced pressure to remove the unreacted raw materials. After the distillation extraction, neutralization, dehydration, and filtration were carried out, and thereby 1,240 g of diisononyl cyclohexane-1,2-diester was obtained (yield: 97%).

Preparation Example 2: Diisononyl terephthalate (DINTP)

After adding 498.0 g of purified terephthalic acid (PTA), 1,296 g of isononanol (INA) (molar ratio of PTA and INA=1.0:3.0), and 1.54 g (0.31 part by weight relative to 100 parts by weight of PTA) of a titanium-based catalyst (tetra isopropyl titanate (TIPT)) to a 3 L four-neck reaction vessel equipped with a cooler, a condenser, a decanter, a reflux pump, a temperature controller, a stirrer, and the like, the temperature was gradually raised to about 170° C. The production of water began at about 170° C. Esterification was carried out for about 4.5 hours at a reaction temperature of about 220° C. and atmospheric pressure while continuously introducing nitrogen gas, and was terminated when the acid value reached 0.01.

After the reaction was completed, distillation extraction was carried out for 0.5 hour to 4 hours under reduced pressure to remove the unreacted raw materials. Steam extraction was carried out for 0.5 hour to 3 hours under reduced pressure using steam to remove the unreacted raw materials to certain levels or less, the temperature of the reaction solution was lowered to about 90° C., and then neutralization was carried out using an alkali solution. Optionally, washing was carried out. Subsequently, the reaction solution was dehydrated to remove moisture. After introducing a filter medium thereto, the dehydrated reaction solution was stirred for a predetermined time and then filtered, and thereby 1,243 g of DINTP was finally obtained (yield: 99.0%).

Preparation Example 3: Diisononyl cyclohexane-1,4-diester (1,4-DINCH)

1,256 g of diisononyl cyclohexane-1,4-diester (yield: 98%) was prepared in the same manner as in Preparation Example 1 except that 516.3 g of cyclohexane-1,4-dicarboxylic acid was used instead of cyclohexane-1,2-dicarboxylic anhydride.

Preparation Example 4: Di(2-ethylhexyl) cyclohexane-1,2-diester (1,2-DEHCH)

1,166 g of di(2-ethylhexyl) cyclohexane-1,4-diester (yield: 98%) was prepared in the same manner as in Preparation Example 1 except that 1,170 g of 2-ethylhexanol was used instead of isononanol.

Preparation Example 5: Tri(2-ethylhexyl) trimellitate (TEHTM)

1,060 g of tri(2-ethylhexyl) trimellitate (TEHTM) (yield: 97%) was prepared in the same manner as in Preparation Example 1 except that 384 g of trimellitic anhydride and 1,170 g of 2-ethylhexanol were added to the reactor.

Preparation Example 6: Triisononyl trimellitate (TINTM)

1,140 g of triisononyl trimellitate (TINTM) (yield: 97%) was prepared in the same manner as in Preparation Example 1 except that 384 g of trimellitic anhydride and 1,296 g of isononanol were added to the reactor.

EXAMPLES AND COMPARATIVE EXAMPLES

The plasticizer compositions of Examples and Comparative Examples were prepared using the materials prepared in Preparation Examples 1 to 6, an epoxidized oil, diisodecyl phthalate (DIDP), di(2-ethylhexyl) terephthalate, and materials obtained by hydrogenating a terephthalate, and are summarized in Table 1 and Table 2. The properties of plasticizer composition were evaluated according to the following test items. Materials other than the materials prepared in Preparation Examples were commercialized products (DEHTP and DIDP manufactured by LG Chem Ltd.).

TABLE 1

| | 1,2-DINCH | DINTP | ESO | TEHTM/TINTM |
|---|---|---|---|---|
| Example 1 | 70 | 30 | — | — |
| Example 2 | 30 | 70 | — | — |
| Example 3 | 50 | 50 | — | — |
| Example 4 | 40 | 60 | — | — |
| Example 5 | 60 | 40 | — | — |
| Example 6 | 20 | 30 | — | 50 (TEHTM) |
| Example 7 | 30 | 40 | — | 30 (TINTM) |
| Example 8 | 40 | 40 | 20 | — |
| Example 9 | 90 | 10 | — | — |
| Example 10 | 10 | 90 | — | — |

TABLE 2

| | Cyclohexane-based | Terephthalate-based | DIDP |
|---|---|---|---|
| Comparative Example 1 | — | — | 100 |
| Comparative Example 2 | 1,2-DINCH 100 | — | — |
| Comparative Example 3 | — | DINTP 100 | — |
| Comparative Example 4 | 1,4-DEHCH 90 | DINTP 10 | — |
| Comparative Example 5 | 1,4-DINCH 70 | DEHTP 30 | — |
| Comparative Example 6 | 1,2-DEHCH 50 | DINTP 50 | — |
| Comparative Example 7 | 1,2-DINCH 50 | DEHTP 50 | — |

1) The units of all of the contents listed in Table 1 and Table 2 are wt %.
2) ESO: epoxidized soybean oil (ESO manufactured by SAJO HAEPYO Corp.)
3) 1,4-DEHCH: di(2-ethylhexyl) cyclohexane 1,4-diester (Eco-DEHCH manufactured by Hanwha Chemical Corporation)

Experimental Example 1: Evaluation of Sheet Performance

By using the plasticizers of Examples and Comparative Examples, test specimens were prepared in accordance with ASTM D638 with the following formulation and preparation conditions.

(1) Formulation: 100 parts by weight of a straight vinyl chloride polymer (LS100 manufactured by LG Chem Ltd.), 50 parts by weight of a plasticizer, 40 parts by weight of a filler (OMYA 1T), 5 parts by weight of a stabilizer (RUP-144), and 0.3 part by weight of lubricant (St-A).
(2) Mixing: performed at 98° C. and 700 rpm.
(3) Test specimen preparation: The material was processed for 4 minutes using a roll mill at 160° C. and for 3 minutes (low pressure) and 2.5 minutes (high pressure) using a press at 180° C., and thereby 1T, 2T, and 3T sheets were prepared.

(4) Test Items

1) Hardness: In accordance with ASTM D2240, Shore hardness (Shore "A" and Shore "D") was measured at 25° C. for 10 seconds using a 3T test specimen. It is evaluated that smaller hardness values indicate better plasticization efficiency.

2) Tensile strength: In accordance with the method specified in ASTM D638, a 1T test specimen was pulled at a cross head speed of 200 mm/min using a UTM (4466 manufactured by Instron), and a time point at which the 1T test specimen was broken was determined. The tensile strength was calculated as follows:

Tensile strength $(kgf/cm^2)$=Load (kgf)/Thickness (cm)×Width (cm).

3) Elongation rate: In accordance with the method specified in ASTM D638, a 1T test specimen was pulled at a cross head speed of 200 mm/min using the UTM, and a time point at which the 1T test specimen was broken was determined. The elongation rate was calculated as follows:

Elongation rate (%)=Length after elongation/Initial length×100.

4) Tensile and elongation retention rates: The tensile and elongation retention rates were determined by measuring the tensile strength and elongation remaining in a specimen after the specimen was heated at 113° C. for 168 hours, and the measurement method thereof was the same as the method of measuring tensile strength and an elongation rate.

5) Migration loss: In accordance with KSM-3156, a test specimen having a thickness of 2 mm or more was prepared, PS plates were attached to both sides of the 1T test specimen, and a load of 1 $kgf/cm^2$ was applied thereto. Subsequently, the test specimen was maintained in a hot-air convection oven (80° C.) for 72 hours and then taken out of the oven and cooled at room temperature for 4 hours. After removing the PS plates attached to both sides of the test specimen, the weights of the test specimen before and after being maintained in the oven were measured. The migration loss was calculated by the following equation:

Migration loss (%)={(Initial weight of test specimen at room temperature−Weight of test specimen after being maintained in oven)/Initial weight of test specimen at room temperature}×100.

6) Volatile loss: The specimen prepared as described above was processed at 113° C. for 168 hours and then weighed, and the volatile loss was calculated by the following equation:

Volatile loss(wt %)=(Initial weight of test specimen−Weight of test specimen after being processed at 113° C. for 168 hours)/Initial weight of test specimen×100.

7) Stress test (stress resistance): After maintaining a 2-mm-thick test specimen in a bent state at 23° C. for 72 hours, a degree of migration (i.e., a degree of bleeding) was evaluated, and the results were described numerically. In this case, values closer to 0 indicate better stress resistance.

8) Cold resistance: Five of the prepared 2T test specimens were maintained at a specific temperature for 3 minutes and then struck, and the temperature at which three out of the five test specimens were broken was measured.

9) Oil resistance: The oil resistance test for measuring resistance to extraction by oil was carried out in accordance with ASTM D1239-14, by immersing, at 70° C. for 4 hours, a 1-mm-thick test specimen in IRM-902 oil that complies with the ASTM standard, subsequently maintaining the test specimen at room temperature for 12 hours or more, subsequently removing the oil, and then measuring the tensile and elongation retention rates.

(5) Evaluation Results

The results of evaluating the above-described test items are shown in the following Table 3 and Table 4.

TABLE 3

| Classification | Hardness Shore A | Hardness Shore D | Tensile strength $(kgf/cm^2)$ | Tensile retention rate (%) | Elongation rate (%) | Elongation retention rate (%) |
|---|---|---|---|---|---|---|
| Example 1 | 92.3 | 46.2 | 179.6 | 109.4 | 286.6 | 88.7 |
| Example 2 | 93.0 | 47.1 | 185.7 | 105.8 | 296.7 | 92.6 |
| Example 3 | 92.7 | 46.7 | 184.6 | 106.2 | 291.4 | 91.4 |
| Example 4 | 92.8 | 46.8 | 185.7 | 108.4 | 293.5 | 91.8 |
| Example 5 | 92.5 | 46.5 | 182.3 | 103.8 | 285.9 | 89.5 |
| Example 6 | 93.1 | 48.5 | 187.8 | 103.4 | 291.0 | 94.3 |
| Example 7 | 93.9 | 49.0 | 188.9 | 104.9 | 296.8 | 88.2 |
| Example 8 | 92.1 | 46.8 | 187.3 | 105.5 | 289.1 | 90.7 |
| Example 9 | 92.0 | 46.1 | 168.7 | 108.9 | 288.2 | 82.3 |
| Example 10 | 94.0 | 48.8 | 189.3 | 99.5 | 288.7 | 92.5 |
| Comparative Example 1 | 93.8 | 48.9 | 168.5 | 96.1 | 273.7 | 83.1 |
| Comparative Example 2 | 91.9 | 46.1 | 178.2 | 109.3 | 287.1 | 59.4 |
| Comparative Example 3 | 94.1 | 49.0 | 191.7 | 98.6 | 297.5 | 92.8 |
| Comparative Example 4 | 90.2 | 44.7 | 156.2 | 102.0 | 256.3 | 42.1 |
| Comparative Example 5 | 92.1 | 46.0 | 168.4 | 92.4 | 265.0 | 58.0 |
| Comparative Example 6 | 91.3 | 45.5 | 170.6 | 88.4 | 283.4 | 78.8 |
| Comparative Example 7 | 91.1 | 45.4 | 172.4 | 90.2 | 276.5 | 80.4 |

TABLE 4

| Classification | Migration loss (%) | Volatile loss (%) | Cold resistance (° C.) | Oil resistance T.S.R | Oil resistance T.E.R | Stress resistance |
|---|---|---|---|---|---|---|
| Example 1 | 3.44 | 8.92 | −31.5 | 94.3 | 78.4 | 0.5 |
| Example 2 | 3.91 | 5.04 | −32.0 | 89.8 | 80.5 | 1.0 |
| Example 3 | 3.52 | 6.34 | −32.5 | 92.6 | 80.2 | 1.0 |
| Example 4 | 3.50 | 6.01 | −32.0 | 92.8 | 80.6 | 1.0 |
| Example 5 | 3.43 | 6.78 | −31.5 | 92.0 | 79.6 | 1.0 |
| Example 6 | 0.78 | 2.54 | −27.0 | 88.2 | 80.9 | 0.5 |
| Example 7 | 1.31 | 4.15 | −30.0 | 89.5 | 86.9 | 0.5 |
| Example 8 | 1.66 | 5.00 | −31.0 | 92.9 | 83.5 | 0.5 |
| Example 9 | 3.40 | 9.52 | −31.5 | 92.4 | 76.7 | 1.0 |
| Example 10 | 3.32 | 2.30 | −33.0 | 90.2 | 81.1 | 1.0 |
| Comparative Example 1 | 2.28 | 5.64 | −25.0 | 88.0 | 71.1 | 0.5 |
| Comparative Example 2 | 4.22 | 14.6 | −31.0 | 81.5 | 71.9 | 2.0 |
| Comparative Example 3 | 3.30 | 2.24 | −33.0 | 83.7 | 75.3 | 3.0 |
| Comparative Example 4 | 4.67 | 17.5 | −31.0 | 82.3 | 62.1 | 3.0 |
| Comparative Example 5 | 6.20 | 11.2 | −32.0 | 80.1 | 65.3 | 3.0 |
| Comparative Example 6 | 3.34 | 8.63 | −31.0 | 84.2 | 73.3 | 2.0 |
| Comparative Example 7 | 3.80 | 8.60 | −30.0 | 82.0 | 70.2 | 2.0 |

Referring to Table 3 and Table 4, it can be seen that in the case of Examples 1 to 10 in which a plasticizer composition according to one embodiment of the present invention was used, plasticization efficiency was improved compared to Comparative Example 1, in which an existing product, DIDP, was used, and that cold resistance was significantly improved. It can also be seen that tensile strength, an elongation rate, and oil resistance were significantly improved, and particularly, residual properties were clearly improved.

Meanwhile, in regard to Comparative Examples 2 and 3 in which a mixture of a cyclohexane-based material and a terephthalate-based material was not used unlike in Examples, based on the fact that Comparative Example 2 exhibited extremely poor properties in terms of volatile loss, oil resistance, and a tensile retention rate and Comparative Example 3 exhibited extremely poor properties in terms of plasticization efficiency, oil resistance, and stress resistance, it can be seen that Comparative Examples 2 and 3 as is are unsuitable for commercialization. On the other hand, referring to Examples 1 to 5, it can be seen that most of the evaluated properties converged to the excellent properties inherent in 1,2-DINCH and DINTP, and particularly, properties such as an elongation rate, oil resistance, and stress resistance were improved, through a synergistic effect, compared to when either one of the two materials was used alone. Based on these facts, it can be confirmed that when a mixture of the two materials is used, since the two materials produce a synergistic effect, the resulting properties are not simply the median of the inherent properties of the individual materials, but the properties can be excellent and adjustable, and furthermore, can be improved in an unexpected way.

In addition, it can be seen that in the case of Comparative Examples 4 and 5 in which a material obtained by hydrogenating a terephthalate was used, tensile strength and an elongation rate lower than those of Examples were exhibited and an extremely low elongation retention rate was exhibited, suggesting that Comparative Examples 4 and 5 are products that cannot be used in the compounding industry.

In addition, it can be seen that in the case of Comparative Example 6, in which a cyclohexane 1,2-diester-based material having 8 carbon atoms was used, and Comparative Example 7, in which di(2-ethylhexyl) terephthalate instead of diisononyl terephthalate was used as a terephthalate-based material, a tensile retention rate and an elongation retention rate lower than those of Examples were exhibited, and the tensile retention rate and the elongation retention rate were lower rather than higher even compared to those of Comparative Example 1, which is an existing product.

The invention claimed is:

1. A plasticizer composition comprising:
a cyclohexane-1,2-diester-based material represented by Chemical Formula 1:

[Chemical Formula 1]

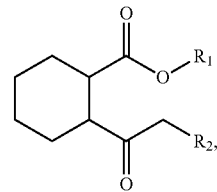

wherein in Chemical Formula 1, $R_1$ and $R_2$ are each independently selected from the group consisting of an isononyl group and a 2-propylheptyl group;
diisononyl terephthalate; and
an additional plasticizer selected from epoxidized oils and trimellitate-based materials,
wherein a weight ratio of the cyclohexane-1,2-diester-based material and the diisononyl terephthalate and 90:10 to 10:90, and
wherein a ratio of a total weight of the cyclohexane-1,2-diester-based material and the diisononyl terephthalate and a weight of the additional plasticizer is 80:20 to 50:50.

2. The plasticizer composition of claim 1, wherein the epoxidized oil is one or more selected from the group consisting of epoxidized soybean oil, epoxidized castor oil, epoxidized linseed oil, epoxidized palm oil, epoxidized stearate, epoxidized oleate, epoxidized tall oil, and epoxidized linoleate.

3. The plasticizer composition of claim 1, wherein the trimellitate-based material is one or more selected from the group consisting of tri(2-ethylhexyl) trimellitate, triisononyl trimellitate, and tri(2-propylheptyl) trimellitate.

4. The plasticizer composition of claim 1, wherein the cyclohexane-1,2-based material is diisononyl cyclohexane-1,2-diester.

5. A resin composition comprising:
   a resin in an amount of 100 parts by weight; and
   the plasticizer composition of claim 1 in an amount of 5 parts by weight to 150 parts by weight.

6. The resin composition of claim 5, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber, and a thermoplastic elastomer.

* * * * *